US012136344B2

(12) United States Patent
Diamond et al.

(10) Patent No.: US 12,136,344 B2
(45) Date of Patent: Nov. 5, 2024

(54) FLEET STORAGE MANAGEMENT SYSTEM

(71) Applicant: Ford Global Technologies, LLC, Dearborn, MI (US)

(72) Inventors: Brendan Diamond, Grosse Pointe, MI (US); Anthony Maraldo, Southgate, MI (US); Stuart C. Salter, White Lake, MI (US); Keith Weston, Canton, MI (US); Ryan O'Gorman, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 18/145,197

(22) Filed: Dec. 22, 2022

(65) Prior Publication Data

US 2024/0212501 A1   Jun. 27, 2024

(51) Int. Cl.
*G08G 1/14* (2006.01)
*B60L 58/13* (2019.01)
*B60L 58/16* (2019.01)

(52) U.S. Cl.
CPC .............. *G08G 1/143* (2013.01); *B60L 58/13* (2019.02); *B60L 58/16* (2019.02); *G08G 1/145* (2013.01); *B60L 2240/545* (2013.01); *B60L 2260/52* (2013.01)

(58) Field of Classification Search
CPC ....................................................... G08G 1/143
See application file for complete search history.

(56) References Cited

U.S. PATENT DOCUMENTS

| | | | |
|---|---|---|---|
| 9,878,631 B2 | 1/2018 | Hyde et al. | |
| 11,472,401 B2* | 10/2022 | Muto | B60R 1/27 |
| 2014/0300494 A1* | 10/2014 | Tseng | B60K 35/00 |
| | | | 340/932.2 |
| 2019/0276010 A1* | 9/2019 | Mason | G05D 1/0212 |
| 2019/0322193 A1 | 10/2019 | Duan et al. | |
| 2020/0317187 A1 | 10/2020 | Assaliyski et al. | |
| 2021/0229570 A1 | 7/2021 | Futter | |
| 2022/0126723 A1* | 4/2022 | Ferguson | B60L 3/0046 |

OTHER PUBLICATIONS

Ford Media Center, Ford Pro Leading Companies into Electrified Future With Electric Vehicles, Charging Solutions, In-Vehicle Software, May 23, 2022.

* cited by examiner

*Primary Examiner* — Travis R Hunnings
(74) *Attorney, Agent, or Firm* — Emily Drake; Eversheds Sutherland (US) LLP

(57) ABSTRACT

A fleet management system is disclosed. The system may include a transceiver configured to receive parking facility attributes associated with a parking facility and vehicle information associated with each vehicle in a vehicle fleet. The parking facility attributes may include parking resource locations in the parking facility and a parking resource availability information. The vehicle information may include a vehicle operational status and a future expected vehicle usage information. The system may further include a processor configured to determine a parking resource for each vehicle based on the parking facility attributes and the vehicle information. The transceiver may transmit a notification to each vehicle including a location of the determined parking resource and associated time period for parking resource usage.

20 Claims, 4 Drawing Sheets

FLEET STORAGE MANAGEMENT SYSTEM

TECHNICAL FIELD

The present disclosure relates to a fleet storage management system, and more particularly, to a vehicle fleet storage management system that optimizes resource allocation in a parking facility based on operational status and expected future usage of each vehicle in a vehicle fleet.

BACKGROUND

With the development of e-mobility infrastructure, several modern vehicles operate on electric energy. Battery Electric Vehicles (BEVs) are increasing being used for personal and commercial purposes. BEVs are specifically gaining prominence in industries such as transportation, e-commerce and the like.

A commercial BEV may operate in demanding conditions and perform heavy-duty activities. For example, a BEV operating on a worksite may be required to load/unload heavy packages in harsh weather conditions. Heavy-duty vehicle usage and ambient weather conditions may affect BEV performance. For example, a High-Voltage (HV) battery charge and discharge capability of a BEV may reduce in cold weather, which in turn may result in a user operating a power derated BEV. In some scenarios, battery cell characteristics may further affect battery charge and discharge capability. For example, cold weather may affect some specific HV battery types (e.g., lithium iron phosphate batteries) more than other battery types.

BEV users typically precondition the HV battery to increase battery temperature prior to vehicle usage. However, battery preconditioning may affect vehicle range, which may not be acceptable to the BEV user, especially if the user expects to perform heavy-duty activities using the BEV. Further, if the BEV is part of a vehicle fleet, preconditioning of batteries of each BEV in the fleet may not be possible due to limited resource availability in a standard vehicle worksite or parking site. Furthermore, battery preconditioning may utilize significant power resources, and hence may not be viable for the fleet operator to precondition each BEV in the fleet.

Thus, there exists a need in the industry for a fleet management system for optimizing parking site resource allocation for a vehicle fleet and minimizing need for vehicle preconditioning.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
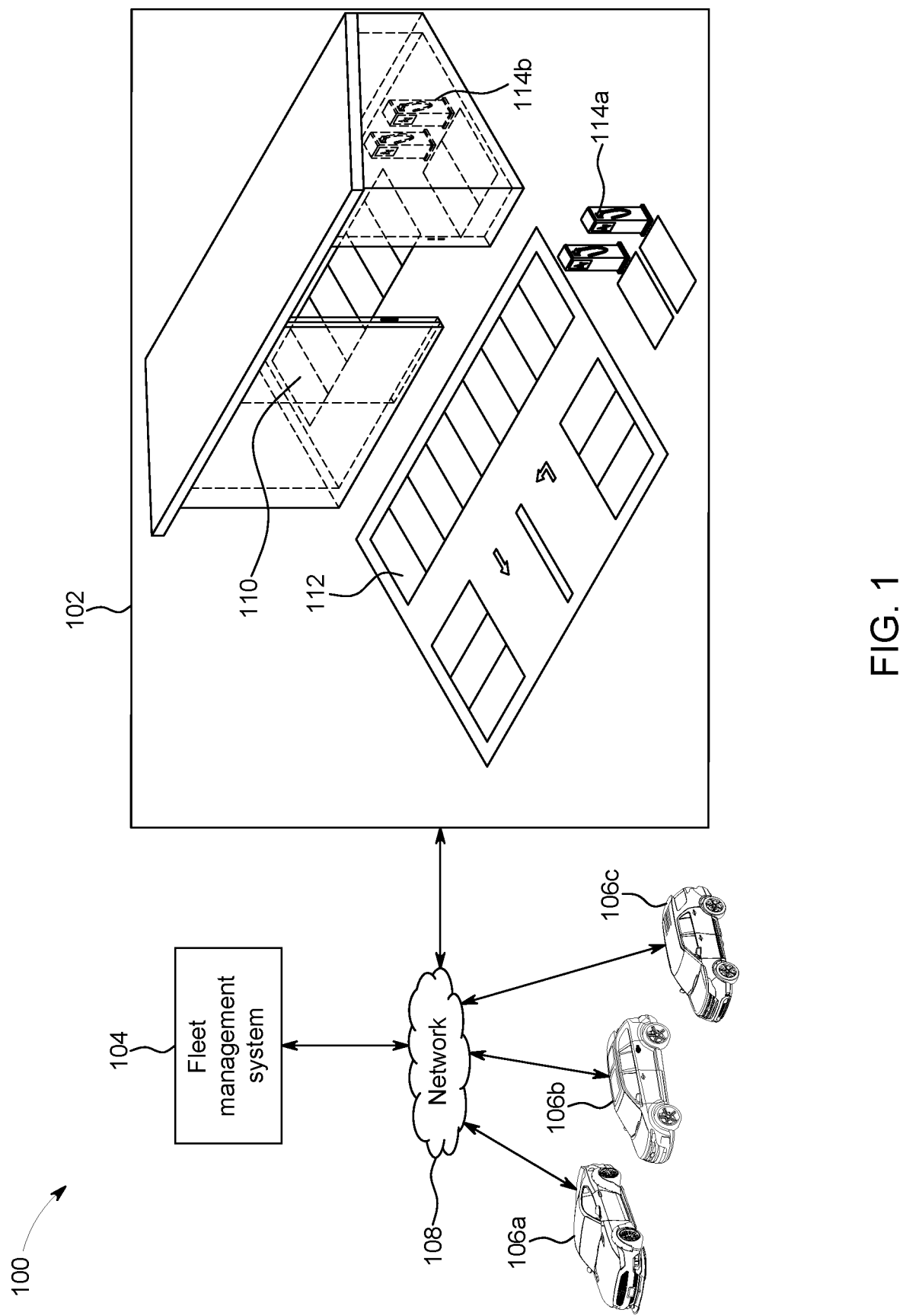
FIG. 1 depicts an example system in which techniques and structures for providing the systems and methods disclosed herein may be implemented.

The present disclosure describes a vehicle fleet management system. The system may allocate parking resources associated with a parking facility to battery electric vehicles (BEVs) of a fleet. The parking resources may include, for example, interior or enclosed parking spots, exterior parking spots, charging spots, and/or the like. The system may allocate the parking resources based on individual vehicle information and parking facility attributes. Specifically, the system may allocate parking resources to each vehicle in the fleet when respective vehicle operators or a fleet operator sends a parking resource request to the system. Responsive to receiving the parking resource request, the system may assess requirements of each vehicle based on respective vehicle information, and accordingly allocate a parking resource to each vehicle in the parking site based on parking facility attributes.

In some aspects, the interior or enclosed parking spots may be heated to room temperature (e.g., 25 degree Celsius) and the exterior parking spots may be at ambient temperature (which may range from minus 15 degree Celsius to plus 10 degree Celsius, if the parking site is located in a cold weather region). The parking facility attributes may include information associated with a number of parking spots and charging spots (or chargers) in the parking facility, their locations, current and expected future availability status, and/or the like.

The vehicle information may include a vehicle operational status and a future expected vehicle usage information. The vehicle operational status may include a current vehicle battery temperature, a battery state of charging (SOC), a battery health information, a vehicle range and/or the like. The future expected vehicle usage information may include an expected travel distance, an expected heavy-duty vehicle usage, an expected towing operation, an expected payload and an expected travel route for a predefined future time, e.g., the next day.

In some aspects, the system may allocate the parking resource to each vehicle based on the vehicle operational status and the future expected vehicle usage information. For example, the system may allocate a charger to a vehicle having a low battery SOC or a degraded battery health. Similarly, the system may allocate an interior (heated) parking spot to a vehicle that may be expected to perform heavy-duty activity the next day. In an exemplary aspect, the system may allocate interior and exterior parking spots to vehicles on a rotational basis. For example, the system may allocate an interior parking spot to a first vehicle for 6 hours in a night and an exterior parking spot to a second vehicle for the same 6 hours. The system may then rotate the first vehicle and the second vehicle after 6 hours, such that the first vehicle and the second vehicle may swap parking resources for the next 6 hours.

The present disclosure discloses a fleet management system that optimizes parking resource allocation to maintain or increase battery (and other vehicle powertrain component) temperature. The system allocates chargers to only those vehicles that need charging, and thus helps in saving charger power resources. Further, the system allocates interior (heated) parking spots to the vehicles that may be expected to perform heavy-duty activities in the near future. The vehicles parked in the interior parking spots may not need preconditioning prior to vehicle usage, and thus the system helps in saving electric/power resources. Further, the vehicles parked in the interior parking spots may maintain or realize warm battery temperatures that may result in an increased battery discharge rate and hence better vehicle performance/range. Better battery discharge rate and vehicle performance may be required for the vehicles involved in heavy-duty activities, and hence the system optimizes parking resource allocation by allocating interior parking spots to those vehicles that may need better vehicle performance for their expected future activities.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example system 100 in which techniques and structures for providing the systems and methods disclosed herein may be implemented. More particularly, FIG. 1 depicts the system 100 that may include a worksite or a parking facility 102, a fleet management system 104 and a plurality of vehicles 106a, 106b, 106c (collectively referred to as a plurality of vehicles 106), connected with each other via a network 108. Specifically, a parking facility 102 computing device (not shown) may be connected to the fleet management system 104 and the plurality of vehicles 106, via the network 108.

The network(s) 108 illustrates an example communication infrastructure in which the connected devices discussed in various embodiments of this disclosure may communicate. The network(s) 108 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The parking facility 102 may include a plurality of parking resources including, but not limited to, a plurality of interior or heated parking spots 110, a plurality of exterior parking spots 112 and a plurality of electric vehicle chargers (or charging spots) 114. The parking facility 102 may provide storage or parking space to vehicles (e.g., the plurality of vehicles 106) and/or enable the vehicles to charge vehicle batteries. In some aspects, the plurality of interior parking spots 110 may be enclosed in a heated room or an enclosure, which may be heated to a preset temperature, e.g., a room temperature in a range of 20 to 27 degree Celsius. Further, as shown in FIG. 1, one or more chargers 114a, 114b (collectively referred to as chargers 114) may be located in a parking facility 102 interior portion (e.g., in a parking spot 110 vicinity), and remaining chargers 114 may be located in a parking facility 102 exterior portion (e.g., in a parking spot 112 vicinity).

In some aspects, the parking facility 102 may include or may be connected with the parking facility 102 computing device (not shown) that may store a parking resource availability information. The parking facility 102 computing device may be a server or an in-house parking facility 102 computer, laptop, tablet, etc., which a parking facility 102 operator (not shown) may operate. In an exemplary aspect, the parking facility 102 operator may update the parking resource availability information at a predefined frequency or when one or more vehicles occupy or vacate at least one of the parking spots 110, the parking spots 112 and/or the chargers 114. The parking resource availability information may include utilization information associated with the parking spots 110, 112 and/or chargers 114. For example, for each parking spot 110, 112 and/or charger 114, the parking resource availability information may include current occupancy status, a future booking status (if any) and an expected time of vacancy (if the parking spot/charger is occupied).

In other aspects, the parking resource availability information may be updated automatically (e.g., by a server or a system, such as the fleet management system 104) as and when a parking spot or a charger is occupied or vacated. In this case, the parking facility 102 operator may not be required to update the parking facility 102 availability information.

In some aspects, the parking facility 102 computing device may be configured to transmit (or provide access of) the parking resource availability information to the fleet management system 104 via the network 108. Further, the parking facility 102 computing device may transmit additional parking resource information to the fleet management system 104 via the network 108. The additional parking resource information may include, but is not limited to, respective ambient temperatures of the parking spots 110 and 112, location of each parking spot 110, 112 and charger 114 in the parking facility 102, and charging rates, levels and types of each charger 114.

The fleet management system 104 may use the parking resource availability information and the additional parking resource information (collectively referred to as parking facility 102 attributes) to optimize parking facility 102 resource allocation. Specifically, the fleet management system 104 may be configured to receive parking facility 102 resource requests from one or more vehicles (e.g., the plurality of vehicles 106) and/or fleet operators, and allocate parking resources to the vehicles based on the parking facility 102 attributes and respective vehicle information of each vehicle, as described below.

In some aspects, the plurality of vehicles 106 may be BEVs and may be part of a vehicle fleet. Each vehicle 106 may take the form of any passenger or commercial vehicle such as, for example, an off-road vehicle, a car, a crossover vehicle, a van, a minivan, a bus, a truck, etc. Further, each vehicle 106 may be a manually driven vehicle and/or may be configured to operate in partially or fully autonomous mode.

A vehicle fleet operator or individual operators of each vehicle 106 may transmit the parking facility 102 resource request to the fleet management system 104, via the network 108, as described above. The vehicle operator may send the parking facility 102 resource request via a user device or a vehicle Human Machine Interface (HMI). In some aspects, the fleet management system 104 may automatically receive the parking facility 102 resource request when the vehicle 106 arrives at the parking facility 102. In this case, vehicle 106 arrival may be detected by a parking facility camera (not shown), which may send the parking facility 102 resource request to the fleet management system 104 when the camera detects the vehicle 106 arrival.

In further aspects, each vehicle 106 may transmit respective vehicle information to the fleet management system 104. The vehicle information may include, but is not limited to, a vehicle operational status and a future expected vehicle usage information. In an exemplary aspect, the vehicle operational status may include a current vehicle HV battery temperature, a battery state of charging (SOC), a battery health condition information, a vehicle range, and/or the like. The future expected vehicle usage information may include an expected travel distance, an expected heavy-duty vehicle usage, an expected towing operation, an expected payload, and an expected travel route (along with associated speed limits) for a predefined future time (e.g., a next day or in the next 24 hours) and/or the like, for each vehicle 106.

In some aspects, each vehicle 106 may transmit respective vehicle information to the fleet management system 104, as described above. In other aspects, the fleet management system 104 may fetch parts of the vehicle information from one or more separate systems or servers (not shown). For example, the fleet management system 104 may receive the future expected vehicle usage information for each vehicle 106 from respective vehicle operators, vehicle memory or a central server (that the vehicle fleet operator may operate) that stores pre-planned future usage plans for each vehicle 106 in the vehicle fleet. In additional aspects, the fleet management system 104 may receive the future expected vehicle usage information from the central server or each vehicle 106, which may determine the future expected vehicle usage information based on historical usage data of each vehicle 106. For example, the central server or a vehicle 106 processor (not shown) may estimate future vehicle usage based on historical vehicle usage of past one week, one month, one quarter, etc., that may be stored in a central server memory or a vehicle 106 memory. The details of the future expected vehicle usage information may be understood in conjunction with FIG. 2.

Responsive to receiving the parking facility 102 resource request, the vehicle information for each vehicle 106 and the parking facility 102 attributes, the fleet management system 104 may determine parking facility 102 resources for each vehicle 106. Specifically, the fleet management system 104 may determine a first set of vehicles that may need the interior or heated parking spots 110, a second set of vehicles that may need chargers 114 and a third set of vehicles that may be parked in the exterior parking spots 112, based on the vehicle information and the parking facility 102 attributes. Further, the fleet management system 104 may determine respective parking spots or chargers, and associated parking or charger usage time periods, for each vehicle 106 based on the parking facility 102 attributes and the vehicle information.

Responsive to determining parking spots or chargers for each vehicle 106, the fleet management system 104 may send a notification to each vehicle 106. The notification may include, for example, a location of the allocated parking spot 110, 112 or the charger 114 for each vehicle 106. The notification may further include time periods for which each vehicle 106 may use the allocated parking spot 110, 112 or the charger 114. In some aspects, the notification may additionally include instructions to reach to the location, when the fleet management system 104 sends the notification to an autonomous vehicle.

A person ordinarily skilled in the art may appreciate that since one or more vehicles 106 (e.g., the first set of vehicles) may be parked on the interior/heated parking spots 110, the first set of vehicles may not require battery preconditioning prior to vehicle usage. Thus, the present disclosure facilitates in minimizing need for battery preconditioning. Further, the first set of vehicles may provide better HV battery charging and discharging capability and vehicle range, as the vehicles are kept in warm condition. Furthermore, in some aspects, the fleet management system 104 may rotate the first set of vehicles, the second set of vehicles and the third set of vehicles, which may result in optimized usage of parking facility 102 resources and better vehicle performance (e.g., HV battery charging and discharging capability and/or vehicle range) for each vehicle 106. The details of parking facility 102 resource allocation may be understood in conjunction with FIG. 2.

Figure 2:
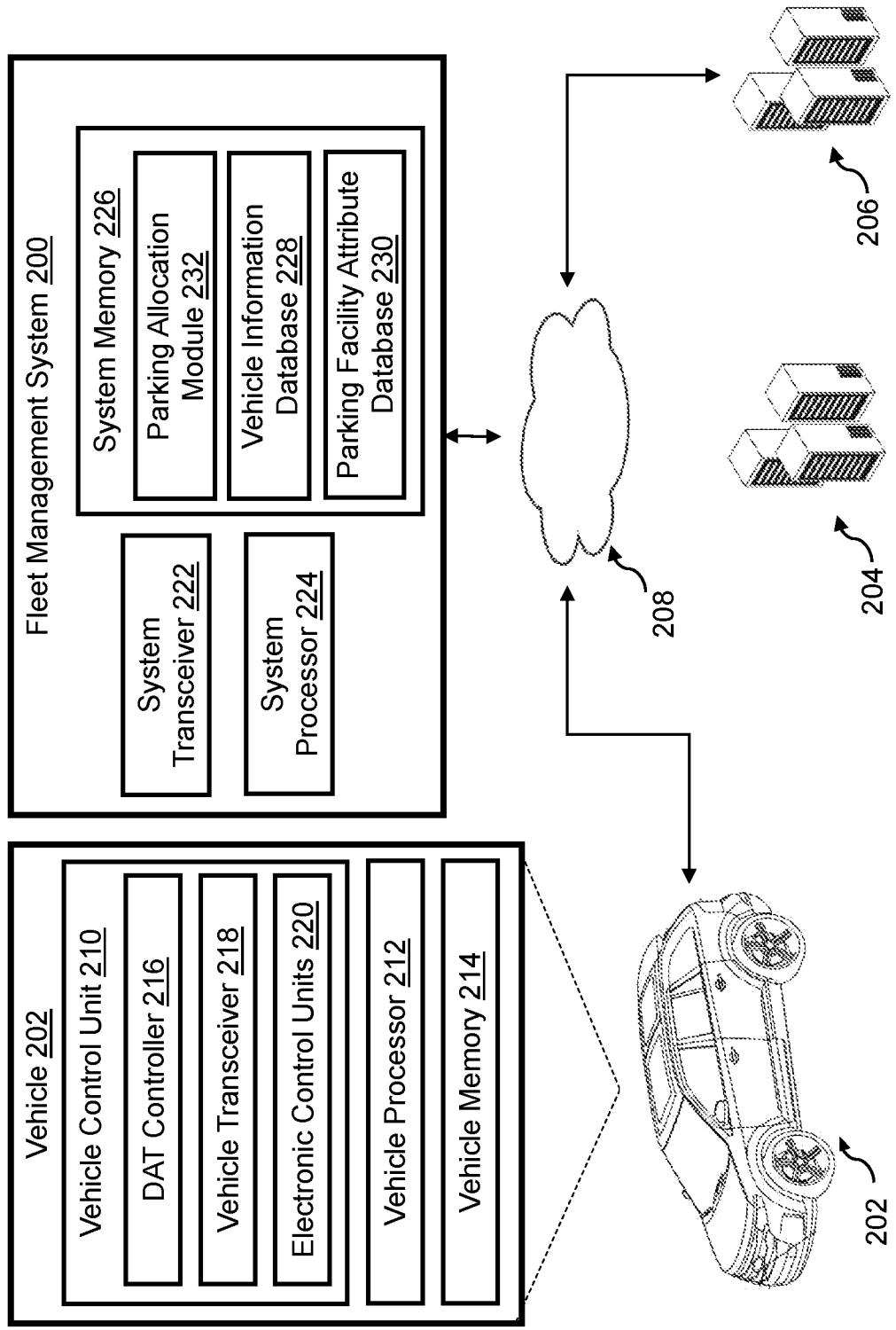
FIG. 2 depicts an example fleet management system in accordance with the present disclosure.

FIG. 2 depicts an example fleet management system 200 in accordance with the present disclosure. While explaining FIG. 2, references may be made to FIG. 3. The fleet management system 200 may be same as the fleet management system 104. The fleet management system 200, as described herein, can be implemented in hardware, software (e.g., firmware), or a combination thereof.

The fleet management system 200 may be connected with a plurality of vehicles 202 (shown as a single vehicle 202 in FIG. 2), a fleet computing device 204 and a parking facility computing device 206, via a network 208. The plurality of vehicles 202, the fleet computing device 204 and the parking facility computing device 206 may be further connected with each other via the network 208. The network 208 may be same as the network 108. The parking facility computing device 206 may be same as the parking facility 102 computing device described above. Further, the parking facility computing device 206 may be associated with a vehicle parking facility (not shown in FIG. 2), e.g., the parking facility 102.

The plurality of vehicles 202 may be same as the plurality of vehicles 106, and may form a vehicle fleet. In some aspects, each vehicle 202 may be include a Battery EV (BEV) driving system. Further, movement, storage, usage, etc. of each vehicle 202 may be controlled or managed by individual vehicle operators (not shown) and/or a fleet operator (not shown). In some aspects, the fleet operator may use the fleet computing device 204 to store information associated with historical and/or future expected usage (e.g., pre-planned usage), future expected vehicle route, vehicle type, etc. for each vehicle 202.

In some aspects, the vehicle 202 may be a manually driven vehicle and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The vehicle 202 may include a plurality of units including, but not limited to, a vehicle control unit (VCU) 210, one or more vehicle processors 212 (or a vehicle processor 212) and a vehicle memory 214 (that may be part of an on-board vehicle computer, not shown), communicatively connected with each other. The VCU 210 may include a plurality of units including, but not limited to, a Driver Assistance Technologies (DAT) controller 216, a vehicle transceiver 218, a plurality of electronic control units (ECUs) 220 and the like. In some aspects, the vehicle transceiver 218 may be outside the VCU 210. The VCU 210 may be configured and/or programmed to coordinate data within vehicle units, connected computing devices (e.g., the fleet computing device 204 and/or the parking facility computing device 206), other vehicles (not shown in FIG. 2) operating as part of the vehicle fleet and the fleet management system 200.

The DAT controller 216 may provide Level-1 through Level-4 automated driving and driver assistance functionality to a vehicle 202 operator. One or more ECUs 220 may be configured to determine vehicle operational status including, but not limited to, a vehicle 202 HV battery health status, a current battery temperature, a battery state of charging (SOC), a vehicle range and/or the like. The battery health status may include information associated with a current vehicle battery discharge rate, battery degradation over time and the like. In an exemplary aspect, the vehicle operational status may additionally include information about intrinsic battery cell characteristics, which may include information associated with typical battery discharge rates or performance at different ambient temperatures.

The vehicle processor 212 may be disposed in communication with one or more memory devices (e.g., the vehicle memory 214 and/or one or more external databases not shown in FIG. 2). The vehicle processor 212 may utilize the vehicle memory 214 to store programs in code and/or to store data for performing various vehicle 202 operations in accordance with the present disclosure. The vehicle memory 214 may be a non-transitory computer-readable memory. The vehicle memory 214 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the vehicle memory 214 may store the vehicle operational status determined by the ECUs 220. The vehicle memory 214 may further store additional information associated with historical and/or expected future vehicle 202 usage. For example, the vehicle memory 214 may store historical information associated with travel distance and route travelled by the vehicle 202 in the past one week, one month, one quarter, one year, and/or the like. Further, the vehicle memory 214 may store historical vehicle 202 usage information. The historical vehicle 202 usage information may include information associated with a percentage of vehicle usage times the vehicle performed heavy-duty activities in the past one week, one month, one quarter, one year, and/or the like, and types of heavy-duty activities performed by the vehicle 202. For example, the vehicle memory 214 may store information indicating that the vehicle performed heavy package loading/unloading activity for 75% of vehicle's usage time in the past one month.

In some aspects, the VCU 210 may send the historical vehicle 202 usage information to the vehicle memory 214 for storage purpose at a predefined frequency or at an end of each trip or activity by the vehicle 202. In other aspects, a vehicle 202 operator may input the historical vehicle 202 usage information on a vehicle Human-Machine Interface (HMI, not shown), and the vehicle HMI may send the information to the vehicle memory 214 for storage purpose.

The vehicle memory 214 may further store the expected future vehicle 202 usage. The expected future vehicle 202 usage may include information associated with scheduled or expected activities, travel routes, travel times and the like, that the vehicle 202 may be expected to undertake in a predefined future time period, e.g., a next day or the next 24 hours.

In some aspects, the vehicle 202 operator may input the expected future vehicle 202 usage on the vehicle HMI, and the vehicle HMI may send the information to the vehicle memory 214 for storage purpose. In other aspects, the vehicle processor 212 may perform predictive analytics based on the historical vehicle 202 usage information (that may be stored in the vehicle memory 214), and estimate the expected future vehicle 202 usage. For example, if the historical vehicle 202 usage information indicates that the vehicle 202 has performed heavy-duty activity for more than 75% of usage time in the past one month, the vehicle processor 212 may estimate that the vehicle 202 may perform heavy-duty activity in the next day or the next 24 hours. Responsive to estimating the expected future vehicle 202 usage, the vehicle processor 212 may send the future usage information to the vehicle memory 214 for storage purpose.

In additional aspects, the vehicle memory 214 may store information associated vehicle type, vehicle model, vehicle year of manufacture, vehicle battery type (along with other vehicle component type), vehicle battery year of manufacture, and/or the like.

The vehicle transceiver 218 may be configured to obtain the vehicle operational status, the historical and/or expected future vehicle 202 usage information, the vehicle and battery type, model, etc. (collectively referred to as vehicle information) from the vehicle memory 214, and transmit the vehicle information to one or more external systems or servers. For example, the vehicle transceiver 218 may transmit the vehicle information to the fleet computing device 204, the parking facility computing device 206 and the fleet management system 200 via the network 208.

A person ordinarily skilled in the art may appreciate that the vehicle architecture shown in FIG. 2 may omit certain vehicle units and/or vehicle computing modules. It should be readily understood that the vehicle 202 depicted in FIG. 2 is an example of a possible implementation according to the present disclosure, and thus, it should not be considered limiting or exclusive.

Further, although the description above describes that the vehicle transceiver 218 may obtain the vehicle information from the vehicle memory 214 and transmit the information to one or more external systems (e.g., the fleet management system 200), a person ordinarily skilled in the art may appreciate that some parts of the vehicle information may be obtained from other systems, different from the vehicle 202. For example, the fleet management system 200 may obtain the expected future vehicle 202 usage information from the fleet computing device 204 when the expected future vehicle 202 usage is pre-planned. Further, in an exemplary aspect, the fleet computing device 204 may perform predictive analytics (as opposed to the vehicle processor 212) on the historical vehicle 202 usage information and estimate the expected future vehicle 202 usage. In this case, the fleet computing device 204 may store or have access to the historical vehicle 202 usage information. For example, the fleet computing device 204 have receive the historical vehicle 202 usage information from the vehicle transceiver 218 at a predefined frequency.

The fleet management system 200 may receive the vehicle information from the vehicle transceiver 218 and/or the fleet computing device 204. Specifically, the fleet management system 200 may include a plurality of units including, but not limited to, a system transceiver 222, one or more system processors 224 (or a system processor 224) and a system memory 226. The system transceiver 222 may be configured to transmit and receive information to and from the vehicle 202, the fleet computing device 204, the parking facility computing device 206, via the network 208. For example, the system transceiver 222 may be configured to receive the vehicle information from the vehicle transceiver 218 and/or the fleet computing device 204.

The system transceiver 222 may be further configured to receive parking facility attributes (e.g., the parking facility 102 attributes) from the parking facility computing device 206. As described above in conjunction with FIG. 1, the parking facility 102 attributes may include the parking resource availability information and the additional parking resource information. The additional parking resource information may include information associated with ambient temperatures of the parking spots 110 and 112, location of each parking spot 110, 112 and charger 114 in the parking facility 102, and charging rates, levels and types of each charger 114, and the like.

The system processor 224 may be disposed in communication with one or more memory devices, e.g., the system memory 226 and/or one or more external databases (not shown in FIG. 2). The system processor 224 may utilize the system memory 226 to store programs in code and/or to store data for performing various system operations in accordance with the present disclosure. The system memory 226 may be a non-transitory computer-readable memory storing a fleet management program code. The system memory 226 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the system memory 226 may include a plurality of modules and databases including, but not limited to, a vehicle information database 228, a parking facility attribute database 230 and a parking allocation module 232. The parking allocation module 232, as described herein, may be stored in the form of computer-executable instructions, and the system processor 224 may be configured and/or programmed to execute the stored computer-executable instructions for performing fleet management system functions in accordance with the present disclosure.

The vehicle information database 228 may store the vehicle information that the system transceiver 222 may be receive from the vehicle transceiver 218 and/or the fleet computing device 204. Specifically, responsive to receiving the vehicle information, the system transceiver 222 may send the vehicle information to the vehicle information database 228 for storage purpose. Similarly, the parking facility attribute database 230 may store the parking facility 102 attributes that the system transceiver 222 may receive from the parking facility computing device 206.

The system processor 224 may be configured to execute instructions stored in the parking allocation module 232 and determine a parking resource (e.g., the parking spot 110, 112 and/or the charger 114) for the vehicle 202 based on the vehicle 202 information and the parking facility 102 attributes. Specifically, the system processor 224 may determine the parking resource for the vehicle 202 in response to receive a parking resource request from the vehicle 202 operator and/or the fleet computing device 204.

In operation, the vehicle 202 operator may send a parking resource request to the system transceiver 222. In particular, each vehicle 202 operator in the vehicle fleet may send their individual parking resource requests to the system transceiver 222. The vehicle 202 operator(s) may send the parking resource request via a user device, or via the vehicle 202 HMI and the vehicle transceiver 218. The parking resource request may include a day and time requirement for the parking resource.

In some aspects, the fleet operator/fleet computing device 204 may send the parking resource request to the system transceiver 222. Specifically, the fleet computing device 204 may include or pre-store parking resource needs for each vehicle 202 for different days and times. In some aspects, the fleet computing device 204 may transmit the parking resource request for each vehicle 202 to the system transceiver 222, based on the pre-stored parking resource needs for each vehicle 202.

The system transceiver 222 may receive the parking request(s) and may send the request(s) to the system processor 224. The system processor 224 may then send, via the system transceiver 222, requests to each vehicle 202 and the parking facility computing device 206 to provide respective vehicle 202 information and the parking facility 102 attributes. Alternatively, the system processor 224 may obtain the vehicle 202 information and the parking facility 102 attributes from the vehicle information database 228 and the parking facility attribute database 230, respectively.

Responsive to obtaining the vehicle 202 information and the parking facility 102 attributes, the system processor 224 may determine a number of vehicles in the vehicle fleet requesting the parking resource. For example, if the system processor 224 receives 30 parking resource requests for parking vehicles for a particular time period (e.g., from 8 PM till 8 AM on a specific day), the system processor 224 may determine that 30 vehicles may need parking spots in the parking facility 102. Responsive to determining the number of vehicles in the fleet needing parking spots, the system processor 224 may execute instructions stored in the parking allocation module 232 and determine parking resources for one or more vehicles in the fleet based on the obtained vehicle information, the parking facility 102 attributes and the number of vehicles in the fleet.

Figure 3:
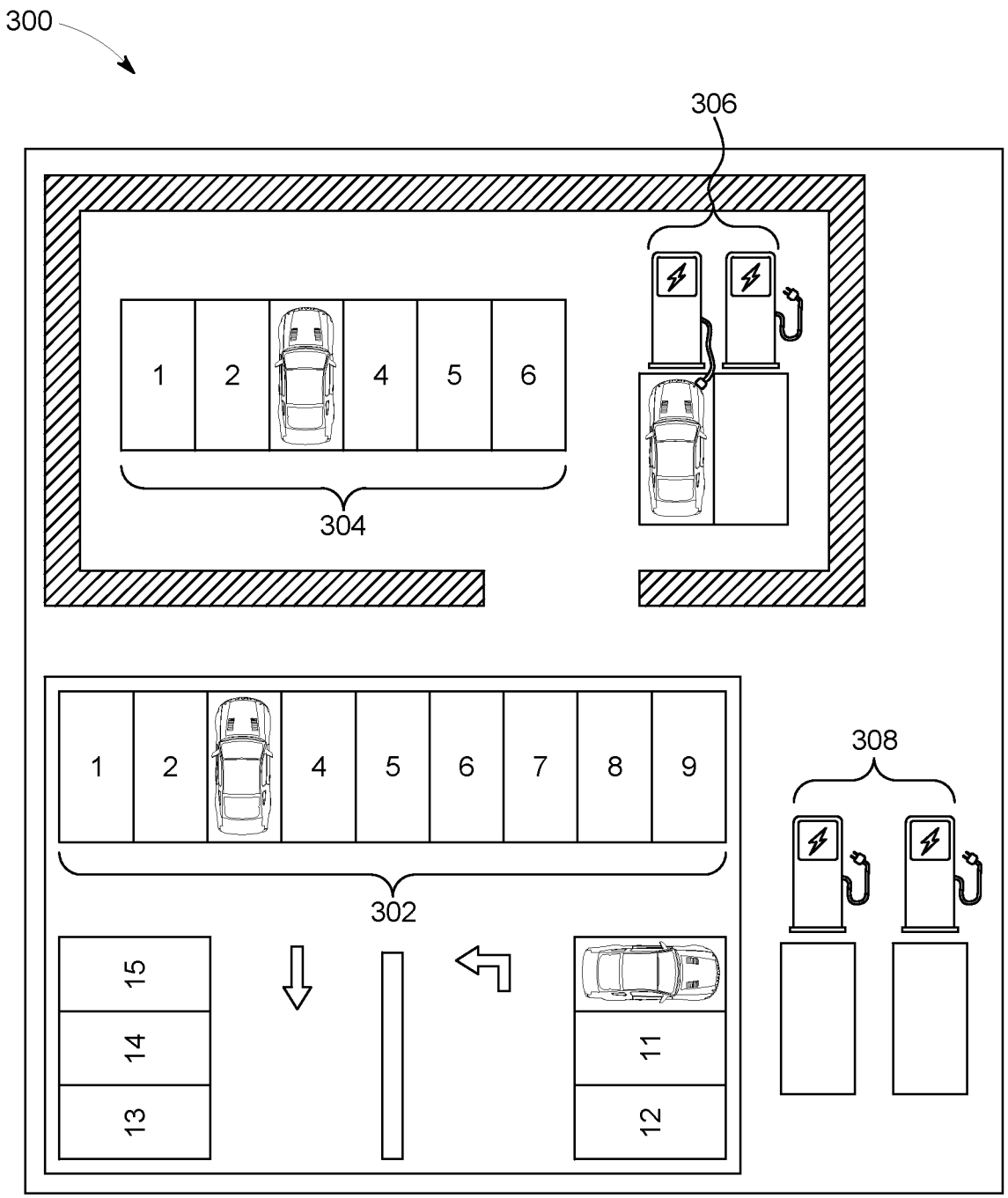
FIG. 3 depicts a snapshot of an example parking facility in accordance with the present disclosure.

For example, the system processor 224 may allocate a heated parking spot, a charger or an external parking spot to a vehicle, based on the vehicle information. An exemplary parking site, including heated parking spots, external parking spots and charging spots, is depicted in FIG. 3. Specifically, FIG. 3 depicts a snapshot of an example parking facility 300 (or parking facility 300) in accordance with the present disclosure.

In an exemplary aspect, the parking facility 300 may include 25 parking spots and charging spots (or chargers). Specifically, the parking facility 300 may include 15 exterior parking spots 302, 6 interior parking spots 304, 2 interior chargers 306 and 2 exterior chargers 308. The interior parking spots 304 may be heated to a room temperature in a range of 23 to 27 degree Celsius. Further, the exterior parking spots 302 may be at ambient temperature. In an exemplary aspect, an ambient weather (i.e., parking spot 302 weather) may be cold having a temperature in a range of minus 15 to plus 5 degree Celsius.

The system processor 224 may obtain parking facility 300 attributes from the parking facility attribute database 230. The system processor 224 may allocate one of the exterior parking spots 302, the interior parking spots 304, the interior chargers 306 or the exterior chargers 308 to the vehicle 202, based on the parking facility 300 attributes and vehicle 202 information (that the system processor 224 may obtain from the vehicle information database 228. For example, the system processor 224 may allocate the charger 306 or the charger 308 to the vehicle 202 when the vehicle SOC is low. Further, the system processor 224 may allocate the interior charger 306 or the exterior charger 308 to the vehicle 202 based on the intrinsic vehicle battery cell characteristics. For example, the system processor 224 may allocate the interior charger 306 to the vehicle 202 when the vehicle SOC is low and when the intrinsic battery cell characteristics indicate that the vehicle 202 battery may get more affected (as compared to other battery types) by exterior/ambient cold temperature.

Further, the system processor 224 may allocate the interior parking spot 304 to the vehicle 202 when the expected future vehicle 202 usage involves heavy-duty activities, towing operation or transportation of heavy payload, for which derated HV battery power or reduced vehicle range may not be acceptable (e.g., to the vehicle 202 operator and/or the fleet operator). Furthermore, the system processor 224 may allocate the interior parking spot 304 to the vehicle 202 when the current vehicle range is low and the expected future vehicle usage may require higher vehicle range or long distance travel. In addition, the system processor 224 may allocate the interior parking spot 304 to the vehicle 202 when the expected future travel route involves travel through rugged terrain or low-grade roads, for which derated HV battery power or reduced vehicle range may not be acceptable to the vehicle 202 operator and/or the fleet operator.

In additional aspects, the system processor 224 may allocate the interior parking spot 304 to the vehicle 202 when the battery health status indicates a higher battery degradation over time. In further aspects, the system processor 224 may allocate the interior parking spot 304 to the vehicle 202 when the intrinsic battery cell characteristics indicate that the vehicle 202 battery may get more affected (as compared to other battery types) by exterior/ambient cold temperature.

In yet another aspect, the system processor 224 may allocate the interior parking spot 304 to the vehicle 202 based on specific request from the vehicle 202 and/or the fleet computing device 204. For example, in an exemplary aspect, the vehicle 202 operator and/or the fleet operator may send a notification (via the vehicle 202 HMI and/or the fleet computing device 204) to the system processor 224 (specifically, to the system transceiver 222) indicating whether derated HV battery power or reduced vehicle range is acceptable to the vehicle 202 operator or the fleet operator. The system processor 224 may allocate the interior parking spot 304 to the vehicle 202 if the vehicle 202 operator or the fleet operator indicates that the derated HV battery power or reduced vehicle range is not acceptable.

In further aspects, the system transceiver 222 may send ambient/exterior and interior parking facility 300 temperatures to the vehicle 202, and the vehicle processor 212 may use the temperature information to estimate the expected HV battery temperature, if the vehicle 202 was parked in the interior parking spot 304 or the exterior parking spot 302. For example, the system transceiver 222 may transmit the ambient/exterior temperature of minus 10 degree Celsius and the interior temperature of 25 degree Celsius to the vehicle 202. Responsive to receiving the temperatures, the vehicle processor 212 may estimate the expected HV battery temperature that the vehicle 202 may achieve if the vehicle 202 is parked inside (i.e., on the interior parking spots 304) or outside (i.e., on the exterior parking spots 302). In some aspects, the vehicle processor 212 may estimate the expected HV battery temperature based on the current battery temperature, the battery health status, battery cell characteristics and/or the like.

Based on the estimated expected HV battery temperature, the vehicle processor 212 may estimate the battery discharge power and/or the vehicle range that the vehicle 202 may achieve during the expected vehicle 202 future usage. The vehicle processor 212 may estimate the battery discharge power and/or the vehicle range based on historical vehicle 202 performance data (that may be stored in the vehicle memory 214). The vehicle 202 may then send a request to the system processor 224 to allocate the interior parking spot 304 or the charger 306, 308 to the vehicle 202, when the estimated battery discharge power and/or the vehicle range derates beyond a predefined threshold percentage (e.g., 15% or 20%). The vehicle 202 may further send the request to the system processor 224 when the estimated battery discharge power/vehicle range is not acceptable to the vehicle 202 (or the vehicle 202 operator) for the expected vehicle 202 future usage.

In additional aspects, the vehicle 202 may transmit to the system processor 224 (specifically, to the system transceiver 222) a minimum desired HV battery temperature that may be associated with a HV battery discharge rate (and hence vehicle performance) that may be acceptable to the vehicle 202 (or the vehicle 202 operator and/or the fleet operator). Responsive to receiving the minimum desired HV battery temperature, the system processor 224 may estimate the expected HV battery temperature that the vehicle 202 may achieve if the vehicle 202 is parked inside (i.e., on the interior parking spots 304) or outside (i.e., on the exterior parking spots 302). The system processor 224 may estimate the expected HV battery temperature based on the current battery temperature, the battery health status, battery cell characteristics and/or the like. The system processor 224 may allocate the interior parking spot 304 to the vehicle 202 if the minimum desired HV battery temperature may be achieved by parking the vehicle 202 in the interior parking spot 304 (as opposed to parking in the exterior parking spot 302).

A person ordinarily skilled in the art may appreciate that the vehicle 202 battery charge and discharge capability may be optimized (e.g., HV battery capacity/power limit may increase with temperature) if the vehicle 202 is parked in the heated or interior parking spot 304. Therefore, the system processor 224 optimizes available parking resources and vehicle performance by allocating the heated or interior parking spots 304 to those vehicles that may be expected to perform heavy-duty activities in the future or the vehicles that may need heated parking environment. The vehicles parked in the heated/interior parking spots 304 may not need preconditioning before next usage.

The system processor 224 may allocate the exterior parking spot 302 to the vehicle 202 when the vehicle information indicates that the vehicle 202 may not need the interior parking spot 304 or the charger 306, 308. For example, the system processor 224 may allocate the exterior parking spot 302 to the vehicle 202 when the vehicle 202 is not expected to perform heavy-duty activity the next day, or when the vehicle 202 does not require charging. Furthermore, based on the number of vehicles in the vehicle fleet needing the interior parking spots 304, the system processor 224 may allocate interior parking spots in separate nearby parking sites (different from the parking facility 300) to one or more vehicles. For example, the system processor 224 may allocate an interior parking spot in a nearby parking site to the vehicle 202, when the vehicle 202 needs an overnight interior parking spot and parking facility 300 attributes indicate that all interior parking spots 304 are booked (e.g., by other vehicles in the vehicle fleet).

The system processor 224 may be further configured to determine a time period for which the vehicle 202 may use the allocated interior parking spot 304, the exterior parking spot 302 or the charger 306, 308. For example, the system processor 224 may determine that the vehicle 202 may need the charger 308 for 8 hours, based on the vehicle information, the ambient exterior parking facility 300 temperature and a charger 308 charging rate and type. Specifically, the system processor 224 may use information associated with the vehicle 202 HV battery health status, the current battery temperature, battery SOC, battery type, battery year of manufacture, etc. to estimate a time period that the charger 308 may need to charge the vehicle 202. In particular, the system processor 224 may use a first lookup table (that may be pre-stored in the system memory 226) that may include information associated with different time periods needed by different battery types to charge at different ambient temperatures, and correlate the information with charger 308 charging rates and type, to estimate the time period for which the vehicle 202 may need the charger 308. For example, for the ambient exterior parking facility 300 temperature of minus 10 degree Celsius, the system processor 224 may determine that the vehicle 202 may need 8 hours to charge using the charger 308. On the other hand, for the interior parking facility 300 temperature of 25 degree Celsius, the system processor 224 may determine that the vehicle 202 may need the charger 306 for 6 hours.

In some aspects, the system processor 224 may determine the time period for which the vehicle 202 may use the allocated parking resource (e.g., the interior parking spot 304, the exterior parking spot 302 or the charger 306, 308) based on the number of vehicles in the fleet, respective vehicle information and parking facility 300 attributes (e.g., parking facility availability information). In additional aspects, the system processor 224 may rotate vehicles in the fleet based on their respective parking resource needs. For example, instead of parking one vehicle (e.g., the vehicle 202) in the interior parking spot 304 for 12 hours overnight, the system processor 224 may allocate the interior parking spot 304 to two (or three) vehicles, and the vehicles may use the interior parking spot 304 on a rotation basis. In this case, a first vehicle may use the interior parking spot 304 for 6 hours while a second vehicle may use the exterior parking spot 302 for the same 6 hours. Thereafter, the second vehicle may move to the interior parking spot 304 and the first vehicle may move to the exterior parking spot 302.

In the example described above, the system processor 224 may optimize parking resource allocation such that a maximum number of vehicles in the vehicle fleet may use the parking facility 300. A person ordinarily skilled in the art may appreciate that in this case, batteries (and other vehicle powertrain components) of two vehicles may reach to an acceptable temperature level (e.g., 60 degree Celsius), as opposed to battery of one vehicle reaching to an optimum temperature level (e.g., 75 degree Celsius). In this manner, the system processor 224 may optimize vehicle performance of two vehicles concurrently (by assisting vehicle batteries to reach to a level of 60 degree Celsius), as opposed to maximizing vehicle performance of one vehicle.

In the case described above, the system processor 224 may use a second lookup table (that may be pre-stored in the system memory 226) that may include information associated with relative times required for changing battery temperatures for different battery types, at different ambient temperatures, to optimize the parking resource rotation. For example, if a first vehicle battery requires 8 hours to reach to a temperature of 60 degree Celsius (based on the current battery temperature, the battery health status, battery cell characteristics, and temperatures of the interior and exterior parking spots 304, 302) and a second vehicle battery requires 4 hours to reach to 60 degree Celsius, the system processor 224 may allocate the interior parking spot 304 to the first vehicle for 8 hours and to the second vehicle for 4 hours.

Responsive to determining the parking resource for each vehicle 202 in the vehicle fleet and the associated time period for parking resource usage, the system processor 224 may transmit, via the system transceiver 222, a parking resource notification to each vehicle 202, the fleet computing device or a user device associated with the vehicle 202 operator/fleet operator. The parking resource notification may include location information of the determined parking resource and the associated time period for usage.

Responsive to receiving the notification, the vehicle 202 operator may move the vehicle 202 to the parking resource at the designated time. In case the vehicle 202 is an autonomous vehicle (partially or fully), the notification may include instructions for the DAT controller 216 to move the vehicle 202 to the parking resource at the designated time.

In an exemplary aspect, if the system processor 224 is not able to identify a parking resource for the vehicle 202 (e.g., when the required parking resource is already booked for other vehicles, or if the number of vehicles in the vehicle fleet is large), the notification to the vehicle 202 may include an indication for the vehicle 202 operator that the parking resource is not available. In this case, the notification may include a recommendation to the vehicle 202 operator indicating that the operator may park the vehicle 202 in a home environment, which may ensure warm parking condition for the vehicle 202.

Figure 4:
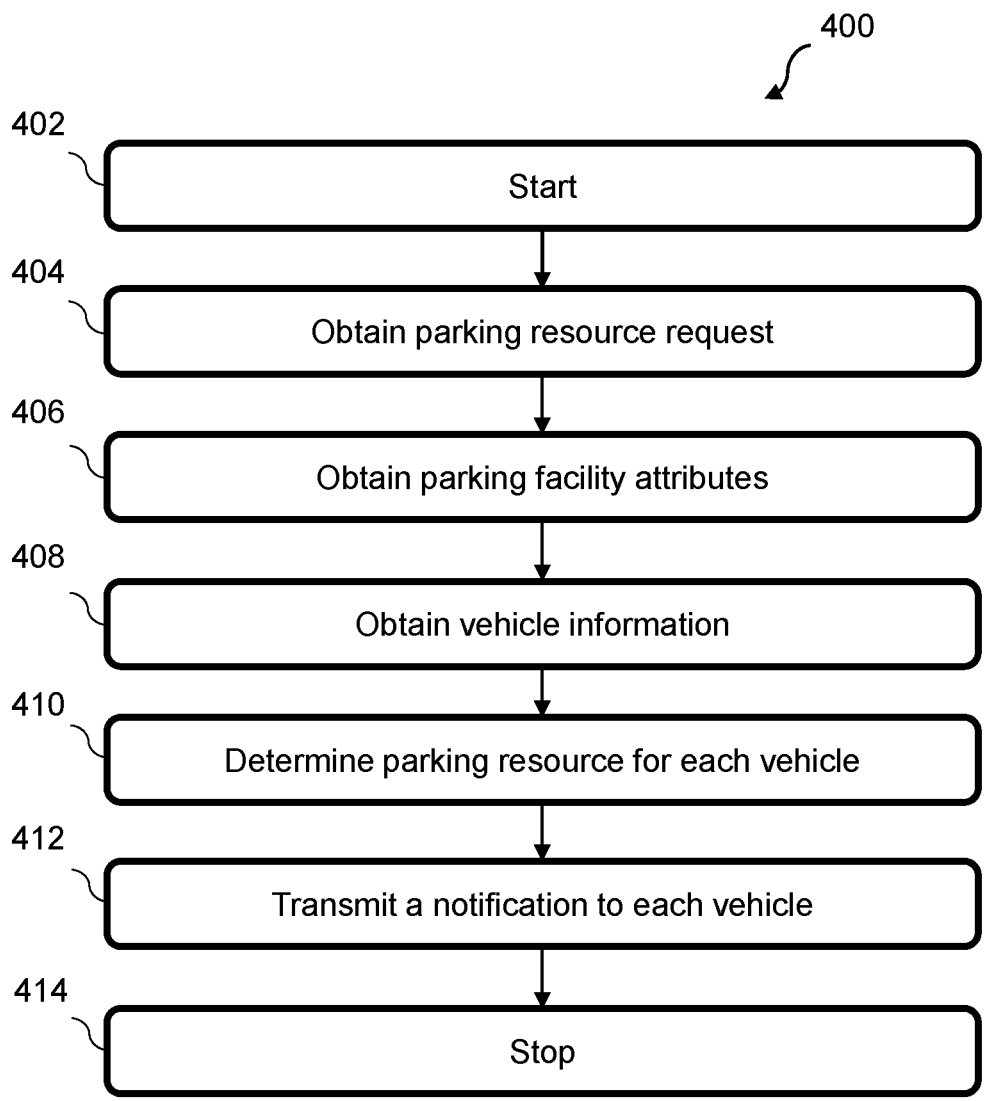
FIG. 4 depicts a flow diagram of an example fleet management method in accordance with the present disclosure.

FIG. 4 depicts a flow diagram of an example fleet management method 400 in accordance with the present disclosure. FIG. 4 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include obtaining, by the system processor 224, parking resource request(s) for vehicles in a vehicle fleet. As described above, the system processor 224 may obtain the parking resource request(s) from the vehicle 202 operator and/or the fleet computing device 204. The parking resource request may include the day and time requirement for the parking resource.

At step 406, the method 400 may include obtaining, by the system processor 224, the parking facility 300 attributes. The system processor 224 may obtain the parking facility 102 attributes from the parking facility computing device 206 or the parking facility attribute database 230.

At step 408, the method 400 may include obtaining, by the system processor 224, the vehicle information for each vehicle 202 in the vehicle fleet. The system processor 224 may obtain the vehicle information from the vehicle 202, the fleet computing device 204 and/or the vehicle information database 228.

Responsive to receiving the parking resource request(s), the parking facility 300 attributes and the vehicle information, at step 410, the system processor 224 may determine the parking resource for each vehicle 202 in the parking facility 300. At step 412, the method 400 may include transmitting, by the system processor 224, a notification to each vehicle 202. The notification may include, for example, determined parking resource location and time period of parking resource usage.

At step 414, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A fleet management method comprising:
    obtaining, by a processor, parking facility attributes comprising parking resource locations in a parking facility and a parking resource availability information;
    obtaining, by the processor, a vehicle information comprising vehicle operational status and a future expected vehicle usage information for each vehicle of a vehicle fleet;
    determining, by the processor, a parking resource for each vehicle based on the parking facility attributes and the vehicle information; and
    transmitting, by the processor, a notification to each vehicle, wherein the notification comprises a location of determined parking resource.

2. The fleet management method of claim 1, wherein the parking resource comprises an interior parking spot, an exterior parking spot or an electric vehicle charger in the parking facility.

3. The fleet management method of claim 2, wherein the parking resource locations comprise locations of the interior parking spot, the exterior parking spot or the electric vehicle charger.

4. The fleet management method of claim 1 further comprising determining a number of vehicles in the vehicle fleet.

5. The fleet management method of claim 4 further comprising:
    determining a time period for each vehicle to use the parking resource, wherein time period determination is based on the number of vehicles, the vehicle information and the parking resource availability information.

6. The fleet management method of claim 1, wherein the vehicle operational status comprises at least one of: a high-voltage (HV) battery temperature, a battery state of charging, a battery health information and a vehicle range.

7. The fleet management method of claim 1, wherein the future expected vehicle usage information comprises at least one of: an expected travel distance, an expected heavy-duty vehicle usage, an expected towing operation, an expected payload, and an expected travel route for a predefined future time.

8. The fleet management method of claim 1, wherein the vehicle information further comprises an indication whether a derated HV battery power or reduced vehicle range is acceptable, or a minimum desired HV battery temperature.

9. The fleet management method of claim 1, wherein the vehicle fleet comprises an autonomous vehicle, and wherein transmitting the notification comprises instructing the autonomous vehicle to reach to the location of the determined parking resource.

10. A fleet management system comprising:
a transceiver configured to:
receive parking facility attributes comprising parking resource locations in a parking facility and a parking resource availability information;
receive a vehicle information comprising vehicle operational status and a future expected vehicle usage information for each vehicle of a vehicle fleet;
a processor communicatively coupled to the transceiver; and
a memory for storing executable instructions, the processor configured to execute the instructions to:
obtain the parking facility attributes and the vehicle information; and
determine a parking resource for each vehicle based on the parking facility attributes and the vehicle information,
wherein the transceiver is further configured to transmit a notification to each vehicle, and wherein the notification comprises a location of determined parking resource.

11. The fleet management system of claim 10, wherein the parking resource comprises an interior parking spot, an exterior parking spot or an electric vehicle charger in the parking facility.

12. The fleet management system of claim 11, wherein the parking resource locations comprise locations of the interior parking spot, the exterior parking spot or the electric vehicle charger.

13. The fleet management system of claim 10, wherein the processor is further configured to determine a number of vehicles in the vehicle fleet.

14. The fleet management system of claim 13, wherein the processor is further configured to:
determine a time period for each vehicle to use the parking resource, wherein time period determination is based on the number of vehicles, the vehicle information and the parking resource availability information.

15. The fleet management system of claim 10, wherein the vehicle operational status comprises at least one of: a high-voltage (HV) battery temperature, a battery state of charging, a battery health information and a vehicle range.

16. The fleet management system of claim 10, wherein the future expected vehicle usage information comprises at least one of: an expected travel distance, an expected heavy-duty vehicle usage, an expected towing operation, an expected payload, and an expected travel route for a predefined future time.

17. The fleet management system of claim 10, wherein the vehicle information further comprises an indication whether a derated HV battery power or reduced vehicle range is acceptable, or a minimum desired HV battery temperature.

18. The fleet management system of claim 10, wherein the vehicle fleet comprises an autonomous vehicle, and wherein the transceiver is configured to transmit the notification that comprises instructions for the autonomous vehicle to reach to the location of the determined parking resource.

19. A non-transitory computer-readable medium storing computer-executable instructions which when executed by one or more processors result in performing operations comprising:
obtaining parking facility attributes comprising parking resource locations in a parking facility and a parking resource availability information;
obtaining a vehicle information comprising vehicle operational status and a future expected vehicle usage information for each vehicle of a vehicle fleet;
determining a parking resource for each vehicle based on the parking facility attributes and the vehicle information; and
transmitting a notification to each vehicle, wherein the notification comprises a location of determined parking resource.

20. The non-transitory computer-readable medium of claim 19, wherein the parking resource comprises an interior parking spot, an exterior parking spot or an electric vehicle charger in the parking facility.

* * * * *